United States Patent [19]  [11] 4,098,985
Brabetz et al.  [45] Jul. 4, 1978

[54] ESTER COPOLYMERS CROSS-LINKABLE UNDER ACID AND ALKALINE CONDITIONS

[75] Inventors: Hartmut Brabetz; Hubert Wiest; Dieter Gorzel, all of Burghausen, Fed. Rep. of Germany

[73] Assignee: Wacker-Chemie GmbH, Munich, Fed. Rep. of Germany

[21] Appl. No.: 718,456

[22] Filed: Aug. 30, 1976

Related U.S. Application Data

[63] Continuation of Ser. No. 608,445, Aug. 28, 1975, abandoned.

[30] Foreign Application Priority Data

Sep. 2, 1974 [DE] Fed. Rep. of Germany ....... 2441892

[51] Int. Cl.$^2$ .......................................... C08F 226/06
[52] U.S. Cl. .................................... 526/261; 260/248; 526/17; 526/18; 528/503; 526/240; 544/194; 544/218

[58] Field of Search ...................... 260/79.3 MU, 79.7; 526/261, 17, 18; 528/503

[56] References Cited

U.S. PATENT DOCUMENTS 3,445,438  5/1969  Hornig et al. ......................... 526/261
3,626,049  12/1971  Yamamoto et al. .................. 264/236

*Primary Examiner*—Harry Wong, Jr.
*Attorney, Agent, or Firm*—Hammond & Littell

[57] ABSTRACT

Ester copolymers cross-linkable under acid, alkaline and heated conditions consisting essentially of a copolymerizate with from 75% to 99% by weight of vinyl and/or acrylic ester monomer units, from 0.2% to 15% by weight of olefinically-unsaturated halotriazine monomer units, from 0.2% to 10% by weight of mono-olefinically unsaturated monomer units containing free or protected N-methylol groups and, optionally, up to 10% by weight of other monomer units copolymerizable with ester monomer units.

21 Claims, No Drawings

ESTER COPOLYMERS CROSS-LINKABLE UNDER ACID AND ALKALINE CONDITIONS

PRIOR APPLICATIONS

This is a continuation of copending application Ser. No. 608,445, filed Aug. 28, 1975, now abandoned.

STATE OF THE ART

The cross-linking of polymers is often necessary so as to modify their properties according to the intended use of the polymers. They may, for example, be cross-linked so as to increase their resistance to organic solvents, to increase their resistance to water, to improve their mechanical resistance, or to reduce their thermoplasticity.

Various comonomers containing reactive groups are often incorporated into polymers so as to make the polymers crosslinkable. Such reactive groups are, for example, carboxy groups, hydroxy groups, amino groups, epoxy groups, N-methylol groups and substituted N-methylol (in which the hydrogen atom of the hydroxy group has been replaced by another atom or group) groups. Cross-linking can then be effected by reacting these polymers containing reactive groups with various polyfunctional compounds. As a rule, however, the cross-linking of any particular type of copolymer can be effected only within a narrow pH range. German Auslegeschrift (DAS) No. 1,249,524, for example, describes various copolymers with acyloxyalkylaminotriazines, which can be cross-linked in an alkaline pH range.

OBJECT OF THE INVENTION

An object of the present invention is the development of ester copolymers based on vinyl and/or acrylic esters which are readily cross-linkable under acidic, alkaline or heated conditions.

Another object of the present invention is the development of an ester copolymer cross-linkable under acidic, alkaline and heated conditions consisting essentially of a copolymerizate with (i) from 75% to 99% by weight of said copolymerizate of ester monomer mixture units, said mixture having from 50% to 100% by weight of an ester monomer selected from the group consisting of (a) vinyl alkanoates having from 1 to 22 carbon atoms in the alkanoate, (b) alcohol esters of acrylic acid, (c) alcohol esters of methacrylic acid, wherein said alcohol is selected from the group consisting of alkanols having from 1 to 18 carbon atoms, cycloalkanols having from 5 to 8 carbon atoms, and mixtures thereof, and (d) mixtures thereof, and from 0 to 50% by weight of said mixture of monomers copolymerizable with said ester monomers selected from the group consisting of (a) vinyl halides, (b) vinylidene halides, (c) vinyl aromatic hydrocarbons, (d) vinyl pyridine, (e) vinyl pyrrolidone, (f) α,β-unsaturated, α-unsubstituted alkenoic acids having from 4 to 10 carbon atoms, and (g) their esters with alcohols selected from the group consisting of alkanols having from 1 to 18 carbon atoms, cycloalkanols having from 5 to 8 carbon atoms and mixtures thereof, (h) α-β-unsaturated alkendioic acids having from 4 to 10 carbon atoms and (j) their esters with alcohols selected from the group consisting of alkanols having from 1 to 18 carbon atoms, cycloalkanols having from 5 to 8 carbon atoms and mixtures thereof, (k) alkenes having from 2 to 8 carbon atoms, (l) conjugated alkadienes having from 4 to 8 carbon atoms, (m) acrylonitrile and (n) mixtures thereof;

(ii) from 0.2% to 15% by weight of said polymerizate of at least one olefinically unsaturated halotriazine monomer units of the formula

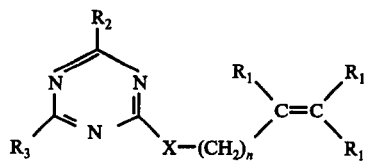

wherein $R_1$ is a member selected from the group consisting of hydrogen and methyl, $R_2$ is a halogen selected from the group consisting of bromo and chloro, $R_3$ is a member selected from the group consisting of hydrogen, hydroxy, lower alkyl, chloro and bromo, X is a bivalent linkage selected from the group consisting of oxygen, sulfur and —NH—, and n is an integer from 0 to 3;

(iii) from 0.2% to 10% by weight of said polymerizate of mono-olefinically unsaturated, nitrogen-containing monomer units, said nitrogen-containing monomer containing a nitrogen group selected from the group consisting of an N-methylol group and a protected N-methylol group which reverts to an N-methylol group when heated or treated with an acid or an alkali compound;

(iv) from 0 to 10% by weight of said polymerizate of mono-olefinically unsaturated monomer units copolymerizable with said ester monomer mixture selected from the group consisting of alkanoic acid amides having from 3 to 8 carbon atoms, acrylic acid, methacrylic acid, esters of acrylic and methacrylic acids with alcohols selected from the group consisting of alkanediols having from 2 to 8 carbon atoms, alkanetriols having from 3 to 8 carbon atoms, alkanehalohydrins having from 2 to 8 carbon atoms, epoxyalkanols having from 3 to 8 carbon atoms, haloalkanediols having from 3 to 8 carbon atoms, aminoalkanols having from 2 to 8 carbon atoms, and alkylaminoalkanols having from 3 to 8 carbon atoms, and vinyl sulfonate; and (v) from 0 to 0.5% by weight of said polymerizate of olefinically-unsaturated polyallyl cross-linking monomer units.

A further object of the invention is the development of a method for the polymerization of the above ester copolymer comprising polymerizing said monomer units in the presence of a polymerization catalyst at temperatures of from 0° to 100° C.

These and other objects of the invention will become more apparent as the description thereof proceeds.

DESCRIPTION OF THE INVENTION

The present invention relates to copolymers of vinyl esters and/or acrylic esters, which can be cross-linked by acidic means, by basic means, or thermally.

The copolymers of the invention comprise (i) from 75% to 99% by weight, preferably from 90% to 99% by weight, of units derived from one or more monomers selected from vinyl esters, acrylic acid esters, methacrylic acid esters, and, optionally, one or more other mono-olefinically or diolefinically unsaturated monomers copolymerizable with esters, provided that the weight of units derived from said other monomers does not exceed the weight of units derived from said ester monomers;

(ii) from 0.2% to 15% by weight, preferably from 0.5% to 5% by weight of units derived from one or more olefinically unsaturated halotriazine derivatives of the formula I

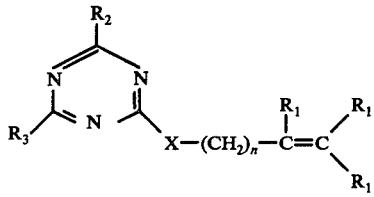

in which each $R_1$ denotes a hydrogen atom or a methyl group, with preferably only one $R_1$ denoting a methyl group, $R_2$ denotes a chlorine or bromine, preferably, a chlorine, $R_3$ denotes a hydrogen, a chlorine or bromine atom, and alkyl group, or a hydroxyl group, preferably, a chlorine atom or hydroxy group, X denotes an oxygen or sulfur atom, or an —NH—group, preferably, an —NH—group, an n denotes the whole number or integer 0, 1, 2 or 3, preferably 1 or 2; and (iii) from 0.2% to 10% by weight, preferably from 0.5% to 8% by weight, of units derived from one or more mono-olefinically unsaturated monomers containing a free or protected N-methylol group.

More particularly, the present invention relates to an ester copolymer cross-linkable under acidic, alkaline and heated conditions consisting essentially of a copolymerizate with (i) from 75% to 99% by weight of said copolymerizate of ester monomer mixture units, said mixture having from 50% to 100% by weight of an ester monomer selected from the group consisting of (a) vinyl alkanoates having from 1 to 22 carbon atoms in the alkanoate, (b) alcohol esters of acrylic acid, (c) alcohol esters of methacrylic acid, wherein said alcohol is selected from the group consisting of alkanols having from 1 to 18 carbon atoms, cycloalkanols having from 5 to 8 carbon atoms, and mixtures thereof, and (d) mixtures thereof, and from 0 to 50% by weight of said mixture of monomers copolymerizable with said ester monomers selected from the group consisting of (a) vinyl halides, (b) vinylidene halides, (c) vinyl aromatic hydrocarbons, (d) vinyl pyridine, (e) vinyl pyrrolidone, (f) $\alpha,\beta$-unsaturated, $\alpha$-unsubstituted alkenoic acids having from 4 to 10 carbon atoms, and (g) their esters with alcohols selected from the group consisting of alkanols having from 1 to 18 carbon atoms, cycloalkanols having from 5 to 8 carbon atoms and mixtures thereof, (h) $\alpha,\beta$-unsaturated alkendioic acids having from 4 to 10 carbon atoms and (j) their esters with alcohols selected from the group consisting of alkanols having from 1 to 18 carbon atoms, cycloalkanols having from 5 to 8 carbon atoms and mixtures thereof, (k) alkenes having from 2 to 8 carbon atoms, (l) conjugated alkadienes having from 4 to 8 carbon atoms, (m) acrylonitrile and (n) mixtures thereof;

(ii) from 0.2% to 15% by weight of said polymerizate of at least one olefinically unsaturated halotriazine monomer units of the formula

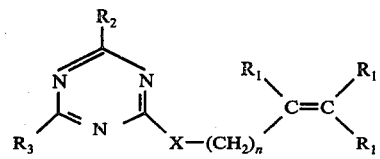

wherein $R_1$ is a member selected from the group consisting of hydrogen and methyl, $R_2$ is a halogen selected from the group consisting of bromo and chloro, $R_3$ is a member selected from the group consisting of hydrogen, hydroxy, lower alkyl, chloro and bromo, X is a bivalent linkage selected from the group consisting of oxygen, sulfur and —NH—, and n is an integer from 0 to 3;

(iii) from 0.2% to 10% by weight of said polymerizate of mono-olefinically unsaturated nitrogen-containing monomer units, said nitrogen-containing monomer containing a nitrogen group selected from the group consisting of an N-methylol group and a protected N-methylol group which reverts to an N-methylol group when heated or treated with an acid or an alkali compound;

(iv) from 0 to 10% by weight of said polymerizate of mono-olefinically unsaturated monomer units copolymerizable with said ester monomer mixture selected from the group consisting of alkanoic acid amides having from 3 to 8 carbon atoms, acrylic acid, methacrylic acid, esters of acrylic and methacrylic acids with alcohols selected from the group consisting of alkanediols having from 2 to 8 carbon atoms, alkanetriols having from 3 to 8 carbon atoms, alkanehalohydrins having from 2 to 8 carbon atoms, epoxyalkanols having from 3 to 8 carbon atoms, haloalkanediols having from 3 to 8 carbon atoms, aminoalkanols having from 2 to 8 carbon atoms, and alkylaminoalkanols having 3 to 8 carbon atoms, and vinyl sulfonate; and (v) from 0 to 0.5% by weight of said polymerizate of olefinically-unsaturated polyallyl cross-linking monomer units.

Component (i) must include units derived from at least one vinyl ester, acrylic acid ester or methacrylic acid ester. The vinyl esters may be esters of any straight or branched carboxylic acid, such as alkanoic acids having from 1 to 22 carbon atoms, and advantageously having up to 18 carbon atoms. Preferably, the vinyl ester is of an alkanoic acid having 2,3 or 4 carbon atoms, optionally in admixture with one of an alkanoic acid having from 8 to 18 carbon atoms. The acrylic and methacrylic acid esters may be of any primary or secondary alcohol, advantageously having up to 18 carbon atoms, such as alkanols having from 1 to 18 carbon atoms and cycloalkanols having from 5 to 8 carbon atoms. Preferably, the acrylic or methacrylic acid ester is of an alcohol having up to 8 carbon atoms, optionally in admixture with up to 35 mol % of an ester of a longer-chain alcohol. Mixtures of two or more vinyl esters and/or acrylic acid esters and/or methacrylic acid esters can be used.

Examples of suitable vinyl esters are vinyl formate, vinyl acetate, vinyl propionate, vinyl butyrate, vinyl hexanoate, vinyl 2-ethylhexanoate, vinyl isononanoate, vinyl laurate, and vinyl versatate ("Versatic acid" is a trade mark for branched chain alkanoic acids having 8 to 18 carbon atoms). Examples of suitable acrylic and methacrylic acid esters are those of methanol, ethanol, propanol, butanol, 2-ethylhexanol, cyclohexanol, and lauryl alcohol.

Component (i) may optionally include units derived from one or more other mono-olefinically or diolefinically unsaturated copolymerizable monomers. The amount of these other units present should not exceed more than 50% by weight, preferably not more than 30% by weight, of the total amount of component (i).

Examples of these other olefinically unsaturated monomers are vinyl halides, for example, vinyl chloride or vinyl fluoride; vinylidene halides, for example, vinylidene chloride or vinylidene fluoride; vinyl aromatic hydrocarbon compounds, for example, styrene, methylstyrene, vinyltoluene; and vinylpyridine; vinylpyrrolidone; $\alpha,\beta$-unsaturated monocarboxylic acids having from 4 to 10 carbon atoms, for example, the $\alpha$-unsubstituted alkenoic acids such as crotonic acid and isocrotonic acid; esters of the said $\alpha,\beta$-unsaturated alkenoic acids with the same alcohols as above, for example, esters with methanol, ethanol, propanol, butanol, and mixtures thereof, esters with 2-ethylhexanol, cyclohexanol, lauryl alcohol, and mixtures thereof, and mixtures of the shortchain esters with up to 35 mol % of the long chain esters; $\alpha,\beta$-unsaturated dicarboxylic acids having from 4 to 10 carbon atoms, such as alkendioic acids, for example, maleic fumaric and itaconic acids, esters of the said $\alpha,\beta$-unsaturated dicarboxylic acids with alcohols having up to 18 carbon atoms, for example, those alcohols mentioned above; olefins or alkenes having from 2 to 8 carbon atoms, for example, ethylene, propylene, and butylene; conjugated diolefins or alkadienes having from 4 to 8 carbon atoms, for example, butadiene, isoprene, and 2,5-dimethylbutadiene; and acrylonitrile.

The units in component (ii) are derived from olefinically unsaturated halotriazine derivatives. Examples of suitable derivatives are:
2-allylamino-4,6-dichloro-s-triazine,
2-allylamino-4-chloro-6-hydroxy-s-triazine,
2-allylamino-4-chloro-6-ethyl-s-triazine
2-allylamino-4-chloro-6-propyl-s-triazine,
2-allyloxy-4,6-dichloro-s-triazine,
2-n-butenyloxy-4,6-dichloro-s-triazine,
2-i-pentenyloxy-4,6-dichloro-s-triazine, and
2-allylthio-4,6-dichloro-s-triazine.

The triazine derivatives may be prepared, for example, as described in Recueil 78 (1959) pages 967 ff, and in Makromolekulare Chemie 81 (1965) pages 129-136.

Component (iii) comprises units derived from one or more mono-olefinically unsaturated monomers containing one or more free or protected N-methylol groups. Examples of such monomers having free N-methylol groups are N-methylolacrylamide, N-methylolmethacrylamide, and N-methylolallylcarbamate. Examples of monomers having protected N-methylol groups, which release free N-methylol groups during cross-linking, that is under acidic or alkaline conditions, or when heated, are N-methylol alkyl ethers and N-methylol esters of the above compounds, and Mannich bases.

It can be advantageous for the copolymers additionally to comprise units derived from one or more functional comonomers. Such units of component (iv) may, optionally, be present in amounts of from 0.5% to 10% by weight, preferably from 1% to 5% by weight of components i + ii + iii. Examples of these comonomers are $\alpha,\beta$-unsaturated carboxylic acids, for example, acrylic acid, methacrylic acid, maleic acid, and fumaric acid; $\alpha,\beta$-unsaturated carboxylic acid amides, for example, acrylamide and methacrylamide; unsaturated monomers containing hydroxy groups and/or epoxy groups and/or halogen atoms, for example, hydroxyethyl acrylate, hydroxyethyl methacrylate, hydroxypropyl acrylate, hydroxybutyl acrylate, glycidyl acrylate, glycidyl methacrylate, 3-chloro-2-hydroxypropyl acrylate, and 1,2-hydroxypropyl acrylate; sulfonic acid derivatives of olefinic compounds, for example, sodium vinyl sulfonate; monoesters and diesters of $\alpha,\beta$-unsaturated monocarboxylic and dicarboxylic acids with amino alcohols, for example, dimethylaminoethyl acrylate.

It can also be advantageous to include cross-linking agents, optionally, as component (v) for example, triallyl cyanurate and diallyl phosphate, preferably in amounts of from 0.05% to 0.5% by weight, based on the weight of the components i + ii + iii.

The manufacture of the copolymers of the invention can be carried out by conventional methods, for example, by bulk, solution, precipitation, suspension, or, preferably, emulsion polymerization. Polymerization may be carried out in the presence of a polymerization initiator and, optionally, a dispersion auxiliary and other auxiliaries, at a temperature of from 0° to 100° C, preferably from 40° to 80° C. The polymerization is advantageously carried out under the autogenous pressure of the monomers. In the case of gaseous monomers, pressure of up to 100 atmospheres gauge may be used, preferably of up to 40 atmospheres gauge.

The polymerization initiators used are the free-radical initiators. Suitable polymerization catalysts or initiators are, for example, inorganic and organic peroxy compounds and certain azo compounds. They may be used in amounts of from 0.01% to 5% by weight, preferably from 0.1% to 3% by weight, relative to the total weight of monomers.

Exmples if suitable peroxy compounds are acyl peroxides, for example, benzoyl or acetyl peroxide; ketone peroxides, for example, methyl ethyl ketone peroxide; peresters, for example, t-butyl perpivalate; alkyl hydroperoxides, for example, t-butyl hydroperoxide and cumene hydroperoxide; and inorganic peroxides, for example, hydrogen peroxide, and sodium potassium, or ammonium peroxydisulfate. A suitable azo compound is, for example, azobisisobutyronitrile.

The initiators may be used in conjunction with reducing agents as redox catalysts, in known manner. The reducing agents may be used in amounts of from 0.01% to 5% by weight, preferbly from 0.1% to 3% by weight, relative to the total weight of monomers.

Examples of suitable reducing agents are sodium sulfite, sodium bisulfite, sodium formaldehyde sulfoxylate, hydrazine, triethanolamine, sulfinic acids, hydrogen in combination with a noble metal sol, preferably a palladium sol, and heavy metal salts, for example, iron, copper, or cobalt sulfate.

Molecular weight regulators, for example, aldehydes, organic halogen compounds, mercaptans, and nitro compounds, can be used in the polymerization medium to control the molecular weight in a conventional manner.

Solvents in which the monomers are soluble are suitable for polymerizations using solvents. Such solvents are, for example, aromatic hydrocarbons such as benzene; chlorinated lower alkanes such as chloroform; lower alkanones such as acetone; lower alkyl alkanoates such as ethyl acetate; tetrahydrofuran; and dioxane. Precipitation polymerization can be carried out using, for example, methanol as the polymerization media. Suspension polymerization can be carried out in water or in an aliphatic hydrocarbon as the suspension medium, optionally with the addition of suspension stabilizers and buffer substances.

The preferred method of manufacturing the copolymers of the invention is by emulsion polymerization in the presence of an emulsifier and/or a protective colloid, a free-radical initiator, and, optionally, one or more other auxiliaries. Suitable dispersions having a solids content of up to 65% by weight can be prepared in this manner.

The protective colloids are suitably used in amounts of from 0.3% to 3% by weight, based on the total amount of monomers. Suitable protective colloids are, for example, polyvinyl alcohol or partially saponified polyvinyl acetates having an acetate content of from 20 to 60 mol %, preferably referably from 35 to 45 mol %; water-soluble cellulose ether derivatives, for example, carboxymethylcellulose, carboxypropylcellulose, hydroxyethylcellulose, and hydroxypropylcellulose; polyvinylpyrrolidone; polyacrylic acids; polyacrylamides and watersoluble acrylic acid and acrylamide copolymers.

The emulsifiers may be either non-ionic or anionic, or mixtures thereof. Anionic emulsifiers are suitably used in amounts of from 0.5% to 3% by weight, based on the total weight of monomers. Non-ionic emulsifiers are suitably used in amounts of from 0.3% to 6% by weight, preferably from 1% to 3% by weight, based on the amount of dispersions.

Examples of suitable anionic emulsifiers are alkylsulfonates, alkarylsulfonates, alkylsulfates, hydroxyalkylsulfates, alkyldisulfonates and alkaryl-disulfonates, sulfonated fatty acids, sulfates and phosphates of alkyl-polyethoxyalkanols, and alkaryl-polyethoxyalkanols, and sulfo-succinic acid esters. Examples of suitable non-ionic emulsifiers are addition products of from 5 to 50 mols of ethylene oxide and/or propylene oxide per mol of straight or branched alkanols having 6 to 22 carbon atoms, alkylphenols, carboxylic acids, carboxylic acid amides, primary and secondary amines and also block polymers of ethylene oxide and/or propylene oxide.

Free-radical initiators that are particularly suitable for use in emulsion polymerization are water-soluble peroxy compounds, for example, peroxydisulfates, hydrogen peroxide, and t-butyl peroxide, optionally together with the reducing agents mentioned above.

Polymerization can be carried out with all of the monomers being initially introduced into the polymerization medium, for example, an aqueous emulsion. Alternatively, one or more of the monomers can be wholly or partially metered in, continually or in doses, during the course of the polymerization.

The copolymers can be manufactured in such a manner that there is substantial no cross-linking. The non-crosslinked copolymers are soluble in a variety of solvents, for example, chlorinated hydrocarbons, dioxane, tetrahydrofuran, toluene, ethyl acetate and butyl acetate.

Cross-linking of the copolymers can be effected thermally by brief heating to a temperature of from 100° to 150° C, preferably from 130° to 150° C. Alternatively, cross-linking can be effected at a pH below 3 by adjustment with an acid or at a pH above 9 by adjustment with a base. The use of an acidic or basic agent can be combined with thermal cross-linking.

Suitable acidic agents or catalysts are, for example, mineral acids, such as dilute hydrochloric or sulfuric acid; organic acids, such as formic acid, acetic acid, oxalic acid, tartaric acid, and p-toluene sulfonic acid; and salts that hydrolyse to give acids in aqueous solution, such as aluminum chloride, ammonium chloride, and zinc nitrate. Suitable basic agents or catalysts are, for example, ammonium hydroxide, sodium hydroxide, calcium hydroxide, and primary, secondary and tertiary bifunctional or polyfunctional amines, such as triethanolamine, triethylamine, diethylenetriamine, and hexamethylenediamine.

The copolymers of the invention may be utilized in solution or, preferably, in aqueous dispersion for a variety of purposes. They may be employed in the field of binders or coating agents as they have after cross-linking, an improved resistance to water and to solvents, an improved mechanical strength, and a reduced surface tackiness. They are particularly suitable as binders for paints, adhesives, fleeces, joint fillers, printing inks, and paper-coating compositions. They are compatible with commonly used auxiliaries, such as pigments fillers, and plasticizers. They can also be used to modify the adhesive strength and mechanical properties of hydraulically setting substances, such as cement, plaster, and lime.

The following examples illustrate the invention without being limitative in any respect.

EXAMPLES

In all the examples the parts and percentages are by weight.

EXAMPLE 1

Preparation of 2-allylamino-4,6-dichloro-s-triazine 18.5 parts of cyanuric chloride were dissolved in 100 parts of acetone and added, while stirring, to a mixture of 300 parts of water and 400 parts of crushed ice. The suspension thus obtained was added to 5.7 parts of allylamine over a period of 30 minutes and subsequently to an aqueous solution of 5.3 parts of sodium carbonate. The white crystalline reaction product was suction-filtered, washed several times with iced water, and dried over phosphorus pentoxide.

Copolymerization 400 ml of water, 31 gm of nonylphenol adducted with 20 mols of ethylene oxide per mol of nonylphenol, 1 gm of a sodium alkylarylsulfonate, 3 gm of sodium vinyl sulfate, and 0.4 gm of potassium peroxydisulfate were placed in a 2 liter round-bottomed flask fitted with a reflux condenser, a stirrer, dosing device, nitrogen inlet and a heatable and coolable jacket. After rinsing with nitrogen, 107 gm of a monomer solution comprising 530 gm of vinyl acetate and 6 gm of allylaminodichlorotriazine were added to the flask contents and the reaction medium was heated to 65° C. Polymerization was initiated by the addition of 10 ml of a solution of 1 gm of sodium formaldehyde sulfoxylate in 40 ml of water, and the remainder was added to the solution in portions over a period of 3 hours. Once the polymerization had started, the remaining vinyl acetate solution, and a solution of 5 gm of acrylic acid, 5 gm of acrylamide, and 30 gm of N-methylolacrylamide, together with a solution of 2.0 gm of potassium peroxydisulfate and 1 ml of concentrated ammonia in 60 ml of water, were added to the reaction mixture over a period of 2 hours.

After all additions had been made, polymerization was continued for a further 30 minutes at 65° C, and then the mixture was cooled. A stable coagulate-free dispersion (of average particle size) was obtained, which was adjusted with water to a solids content of 50%, and which then had a viscosity of 600 cPs (measured with the Epprecht-Rheometer, stage III). The pH of the dispersion was 4.5. Two samples were taken from the dispersion. One was adjusted to a pH of 2 with 5N HCl and the other to a pH of 10 using 5N NaOH. Both from the original dispersion and from the acid and alkaline samples, a 0.2 gm thick film was cast, and the degree of cross-linking and the swelling index of the untempered film and of the films after tempering at 150° C for 2 minutes were determined in the manner described below.

(a) Degree of Cross-linking

Approximately 500 mg ($G_1$) of the air-dried dispersion film were boiled in a 300 ml Erlenmeyer flask, with ground stopper equipped with a reflux condenser, in 50 ml of ethyl acetate for 6 hours under reflux. The solids contained in 20 ml of the clear solution was determined after evaporating the solvent and drying at 100° C to constant weight ($G_2$). The degree of cross-linking DC was calculated as follows:

$$\% DC = 100 - (250 \cdot G_2/G_1)$$

(b) Swelling Index 50 ml of ethyl acetate were introduced, using a pipette, into a 300 ml Erlenmeyer flask with a ground stopper. A 15 gm wide and 30 gm long strip of the air-dried film of the dispersion having a weight of 100 to 200 gm (G) was placed in the solvent for 24 hours and the whole was shaken occasionally. The swollen film was then dried with parchment paper and was immediately introduced into a weighed weighing glass with a ground lid ($W_1$), which was then re-weighed ($W_2$). 20 ml of the solution were put into a beaker which has been weighed exactly and contained boiling stones ($B_1$) and this was reweighed ($B_2$) after the solvent had evaporated and after the residue has been dried at 110° C to constant weight. The swelling index S was calculated according to the following formula $$S = \frac{W_2 - W_1}{G - (B_1 - B_2) \cdot 2.5}$$

The results are tabulated below:

|  | Untempered film | | |
|---|---|---|---|
| pH | 2 | 4.5 | 10 |
| DC % | 77 | 0 | 75 |
| S | 2.9 | — | 3.5 |
|  | Tempered film (150° C for 2 minutes) | | |
| pH | 2 | 4.5 | 10 |
| DC % | 92 | 90 | 87 |
| S | 2.0 | 2.6 | 2.5 |

EXAMPLE 2

345 ml of water, 24 gm of a partially saponified polyvinyl alcohol having a hydrolyzation degree of 90% and 2 gm of nonylphenol adducted with 23 Mols of ethylene oxide per mol of nonylphenol, were introduced into the apparatus described in Example 1. After rinsing with nitrogen, 115 gm of a monomer solution consisting of 455 gm of vinyl acetate, 6 gm of 2-allyloxy-4,6-dichloro-s-triazine (prepared in known manner according to Makromolekulare Chemie, 81 (1965) pages 129–136), and 2 gm of tertiary-butyl hydroperoxide, were added to the mixture present in the apparatus, and the mixture was heated to 65° C. The polymerization was initiated by the addition of 15 ml of a solution of 1 gm of sodium formaldehyde sulfoxylate and 1 gm of sodium bicarbonate in 60 ml of water, and the rest of the solution was dosed in over a period of 3 hours. After polymerization had started, the remaining vinyl acetate solution and a solution of 30 gm of N-methylolacrylamide in 130 ml of water were added to the reaction mixture over a period of 2 hours. When all additions had finished, polymerization was continued at 70° C for a further hour and the mixture was then cooled. A stable, coarse-particle, coagulate-free dispersion was obtained having a solids content of 50%, and a viscosity of 500 cPs (Epprecht-Rheometer, stage III). Films produced from this dispersion as described in Example 1, gave the following cross-linking values:

|  | Untempered film | | |
|---|---|---|---|
| pH | 2 | 4.5 | 10 |
| DC % | 92 | 0 | 86 |
| S | 2.1 | — | 2.8 |
|  | Tempered film | | |
| pH | 2 | 4.5 | 10 |
| DC % | 95 | 36 | 85 |
| S | 1.9 | 3.8 | 2.8 |

EXAMPLE 3

310 ml of water, 23 gm of a partially saponified polyvinyl alcohol having a degree of hydrolization of 87%, 0.4 gm of a sodium alkylarylsulfonate, 0.1 gm of calcium chloride, 0.4 gm of tartaric acid, and 0.7 gm of propionaldehyde were introduced into the apparatus described in Example 1. After rinsing with nitrogen, 65 gm of a monomer solution consisting of 400 gm of vinyl acetate, 122 gm of vinyl laurate, 2 gm of an organic hydroperoxide, and 5 gm of 2-allylamino-4,6-dichloro-s-triazine, were added and the reaction medium was heated to 65° C. The polymerization was initiated by the addition of 15 ml of a solution of 1 gm of sodium formaldehyde sulfoxylate and 1 gm of sodium hydrogen carbonate in 60 ml of water, and the rest of this solution was dosed in over a period of 3 hours. After the polymerization had started, the rest of the vinyl acetate solution and a solution of 30 gm of the Mannich base of acrylamide with dimethylamine ($CH_2=CH-CO-NH-CH_2-N(CH_3)_2$) in 130 ml of water were added to the reaction mixture over a period of 2 hours. When all doses had been added, polymerization was continued at 65° C for another 30 minutes, and the mixture was then cooled. A coarsely-particulate, stable, coagulate-free polymer dispersion was obtained, which had a viscosity of 4200 cPs (Epprecht-Rheometer, stage III) at a solids content of 50%. Films produced from this dispersion as described in Example 1, had the following properties:

|  | Untempered film | | |
|---|---|---|---|
| pH | 2 | 4 | 10 |
| DC % | 83 | 0 | 75 |
| S | 2.8 | — | 3.4 |
|  | Tempered film | | |
| pH | 2 | 4 | 10 |
| DC % | 91 | 54 | 95 |
| S | 2.2 | 3.7 | 3.1 |

EXAMPLE 4

420 ml of water, 24 gm of nonylphenol adducted with 23 mols of ethylene oxide per mol of nonylphenol, 3 gm of a sodium alkylaryl sulfonate, 3 gm of sodium vinyl sulfonate, 16 gm of acrylamide, 2 gm of potassium peroxydisulfate, 165 gm of diethylhexyl maleate, 435 gm of vinyl acetate, and 6 gm of 2-allylamino-4,6-dichloro-s-triazine were introduced into the apparatus described in Example 1, and the mixture was emulsified with a high-speed stirrer for 5 minutes. The reaction medium was then heated to 65° C, and the polymerization was initiated by the addition of 20 ml of a solution of 1.2 gm of sodium bisulfate, and 2.3 gm of concentrated ammonia in 125 ml of water. The rest of this solution was dosed in over a period of 2 hours. After the polymerization had started, a solution of 30 gm of N-methylolacrylamide in 130 ml of water was dosed in over a period of 2.5 hours. When both the additions had been completed, polymerization was continued for another 1 hour at 70° C, and the mixture was then cooled. A stable, coagulate-free polymer dispersion having particles of an average size was obtained, which was adjusted to a solids content of 50% with water and then had a viscosity of 1800 cPs (Epprecht-Rheometer, stage III). Films produced as described in Example 1, had the following properties:

|      | Untempered film |   |    |
| ---- | --- | --- | --- |
| pH   | 2   | 4   | 10  |
| DC % | 57  | 0   | 93  |
|      | Tempered film |  |   |
| pH   | 2   | 4   | 10  |
| DC % | 76  | 65  | 94  |

350 ml of water, 25 gm of isotridecyl alcohol adducted with 20 mols of ethylene oxide per mol of the alcohol, 1 gm of sodium alkylarylsulfonate, 2 gm of sodium vinyl sulfonate, and 0.5 gm of ammonium peroxydisulfate were introduced into the apparatus described in Example 1. After purging with nitrogen, 50 gm of a monomer mixture consisting of 450 gm of vinyl acetate, 50 gm of butyl acrylate, and 10 gm of 2-allylamino-4,6-dichloro-s-triazine, were added to the mixture in the apparatus and the reaction medium was heated to 65° C. The polymerization was initiated by adding 10 ml of a solution of 1 gm of sodium metabisulfite and 2 gm of sodium bicarbonate in 35 ml of water, and the remainder of this solution was dosed in continuously at the rate of 10 ml per hour. After the polymerization had started, the remaining monomer mixture and a solution of 20 gm of N-methylolacrylamide and 5 gm of acrylic acid in 115 ml of water, were dosed in over a period of 2 hours. When all additions had been completed, polymerization was continued for another 30 minutes at 65° C, and then the mixture was cooled. A coagulate-free, stable dispersion having fine particles was obtained. With a solids content of 50%, the viscosity was 200 cPs (Epprecht-Rheometer, stage III). Tempered films were prepared as in Example 1, but at 4 pH values. These films were transparent and highly glossy, and had the following properties:

|      | Tempered film |     |      |     |
| ---- | --- | --- | ---- | --- |
| pH   | 2   | 4   | 7    | 10  |
| DC % | 93  | 93  | 92.5 | 93  |
| S    | 3.3 | 3.5 | 3.8  | 3.0 |

EXAMPLE 6

6 kg of water, 0.25 kg of nonylphenol adducted with 20 mols of ethylene oxide per mol of nonylphenol, and 20 gm of sodium alkylarylsulfonate were introduced into a 16 liter stirred autoclave equipped with a dosing device and jackets which may be heated or cooled. The mixture was freed from atmospheric oxygen by purging with nitrogen. 500 gm of a monomer mixture consisting of 5 kg of vinyl acetate and 100 gm of 2-allylamino-4,6-dichloro-s-triazine were then added, heated while stirring to 45° C, and brought to a constant pressure of 55 atmospheres gauge using ethylene. Polymerization was initiated by adding 20 ml of a 0.1% strength palladium sol, 2 atmospheres gauge of hydrogen and 7 gm of ammonium peroxydisulfate in 150 ml of water. At the start of the polymerization, about 5 minutes after adding the peroxydisulfate, the addition of the remaining monomer mixture and a solution of 200 gm of N-methylolacrylamide dissolved in 450 ml of water was started and these two supplies were dosed in continuously over a period of 6 hours. Furthermore, a solution of 25 gm of ammonium peroxydisulfate and 4 gm of concentrated ammonia in 500 ml of water was dosed in over a period of 8 hours. When all additions were complete, polymerization was continued for another 1 hour at 45° C and the mixture was then cooled to room temperature and after reducing the pressure to atmospheric pressure, evacuated briefly. A stable, fine particulate, coagulate-free dispersion was obtained. The ethylene content of the polymer was 22%. Films of the dispersion were produced at five different pH values as described in Example 1. These films were transparent, shiny and free of any stickiness after tempering. They exhibited a high degree of flexibility and a high viscosity. They had the following properties.

|      | Tempered film |     |     |     |     |
| ---- | --- | --- | --- | --- | --- |
| pH   | 2   | 4   | 7   | 9   | 12  |
| DC % | 84  | 84  | 83  | 84  | 84  |
| S    | 3.0 | 4.5 | 4.8 | 4.5 | 3.5 |

EXAMPLE 7

300 gm of water, 60 gm of isotridecyl alcohol adducted with 15 mols of ethylene oxide per mol of the alcohol, 5 gm of sodium alkylsulfonate, and 0.25 gm of sodium vinyl sulfonate were introduced into the apparatus described in Example 1 and heated, while stirring, to 80° C. An emulsion consisting of 530 gm of water, 2 gm of potassium peroxydisulfate, 1.5 gm of sodium alkylsulfonate, 8 gm of acrylic acid, 495 gm of methyl methacrylate, 405 gm of butyl acrylate, 15 gm of N-methylolacrylamide and 18 gm of 2-allylamino-4,6-dichloro-s-triazine was dosed in over a period of 2 hours, the reaction temperature being maintained at 80° C. One hour after the monomer emulsion had been completely added, the mixture was cooled. A stable dispersion free of any coagulate was obtained. Films produced from this dispersion, as described in Example 1, had the following properties:

|      | Tempered film |     |      |
| ---- | --- | --- | ---- |
| pH   | 3   | 7   | 10   |
| DC % | 93  | 95  | 96.5 |
| S    | 4.5 | 4.6 | 3.7  |

EXAMPLE 8

4 kg of water, 100 gm of hydroxyethylcellulose, 110 gm of nonylphenol adducted with 20 mols of ethylene oxide per mol of nonylphenol, and 6 gm of sodium alkylarylsulfonate were introduced into a 16 liter stirred autoclave with equipment for dosing and heatable and coolable jackets, and the autoclave was freed of atmospheric oxygen by purging with nitrogen. A monomer mixture consisting of 2.7 kg of vinyl acetate, 1.3 kg of vinyl laurate, 10 gm of t-butyl hydroperoxide, 100 gm of N-methylolacrylamide and 50 gm of 2-butenylamino-4,6-dichloro-s-triazine was then added while stirring. The contents of the autoclave were then heated to 65° C and brought to a pressure of 3 atmospheres gauge using vinyl chloride. Polymerization was initiated by commencing the addition of a solution of 6 gm of sodium formaldehyde sulfoxylate and 5 gm of sodium bicarbonate in 1 liter of water at a rate of about 100 ml per hour and at an internal temperature of 55° C. Polymerization was continued for 7 hours at 65° C and for a further 4 hours at 85° C, during which time the vinyl chloride pressure decreased slowly. Finally the mixture was cooled to room temperature and was evacuated briefly. A stable, coagulate-free dispersion was obtained having a viscosity of about 3000 cPs at a solids content of 50% (measured with the Epprecht-Rheometer stage III). Film produced from these dispersions, as described in Example 1, had the following properties

|  | Untempered film | | |
|---|---|---|---|
| pH | 2 | 4 | 10 |
| DC % | 60 | 0 | 85 |
| S | 4.5 | — | 4.0 |
|  | Tempered film | | |
| pH | 2 | 4 | 10 |
| DC % | 70 | 64 | 93 |
| S | 3.5 | 4.2 | 3.0 |

The preceeding specific embodiments are illustrative of the practice of the invention. It is to be understood however, that other expedients known to those skilled in the art or disclosed herein may be employed without departing from the spirit of the invention or the scope of the appended claims.

We claim:

1. A substantially-non-cross-linked ester copolymer which is cross-linkable under acidic, alkaline and heated conditions consisting essentially of a copolymerizate with
   (i) from 75% to 99% by weight of said copolymerizate of ester monomer mixture units, said mixture having from 70% to 100% by weight of an ester monomer selected from the group consisting of (a) vinyl alkanoates having from 1 to 22 carbon atoms in the alkanoate, (b) alcohol esters of acrylic acid, (c) alcohol esters of methacrylic acid, wherein said alcohol is selected from the group consisting of alkanols having from 1 to 18 carbon atoms, cycloalkanols having from 5 to 8 carbon atoms, and mixtures thereof, and (d) mixtures thereof, and from 0 to 30% by weight of said mixture of monomers copolymerizable with said ester monomers selected from the group consisting of (a) vinyl halides, (b) vinylidene halides, (c) vinyl aromatic hyrocarbons, (d) vinyl pyridine, (e) vinyl pyrrolidone, (f) $\alpha,\beta$-unsaturated, $\alpha$-unsaturated alkenoic acids having from 4 to 10 carbon atoms, and (g) their esters with alcohols selected from the group consisting of alkanols having from 1 to 18 carbon atoms, cycloalkanols having from 5 to 8 carbon atoms and mixtures thereof, (h) $\alpha,\beta$-unsaturated alkendioic acids having from 4 to 10 carbon atoms and (j) their esters with alcohols selected from the group consisting of alkanols having from 1 to 18 carbon atoms, cycloalkanols having from 5 to 8 carbon atoms and mixtures thereof, (k) alkenes having from 2 to 8 carbon atoms, (l) conjugated alkadienes having from 4 to 8 carbon atoms, (m) acrylonitrile and (n) mixture thereof;
   (ii) from 0.2% by 15% by weight of said polymerizate of at least one olefinically unsaturated halotriazine monomer units of the formula

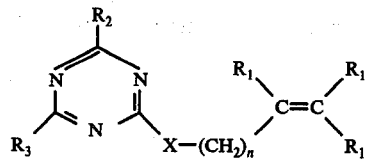

wherein $R_1$ is a member selected from the group consisting of hydrogen and methyl, $R_2$ is a halogen selected from the group consisting of bromo and chloro, $R_3$ is a member selected from the group consisting of hydrogen, hydroxy, lower alkyl, chloro and bromo, X is a bivalent linkage selected from the group consisting of oxygen, sulfur and —NH—, and $n$ is an integer from 0 to 3;
   (iii) from 0.2% to 10% by weight of said polymerizate of mono-olefinically unsaturated nitrogen-containing monomer units, said nitrogen-containing monomer containing a nitrogen group selected from the group consisting of (a) an N-methylol group selected from the group consisting of N-methylolacrylamide, N-methylolmethacrylamide and N-methylolallyl carbamate and (b) a protected N-methylol group which reverts to an N-methylol group when heated or treated with an acid or an alkali compound selected from the group consisting of alkyl ethers of the compounds of (a) above, esters of the compounds of (a) above, and Mannich bases of the compounds of (a) above;
   (iv) from 0 to 10% by weight of said polymerizate of mono-olefinically unsaturated monomer units copolymerizable with said ester monomer mixture selected from the group consisting of alkenoic acid amides having from 3 to 8 carbon atoms, acrylic acid, methacrylic acid, esters of acrylic and methacrylic acids with alcohols selected from the group consisting of alkanediols having from 2 to 8 carbon atoms, alkanetriols having from 3 to 8 carbon atoms, alkanehalohydrins having from 2 to 8 carbon atoms, epoxyalkanols having from 3 to 8 carbon atoms, haloalkanediols having from 3 to 8 carbon atoms, aminoalkanols having from 2 to 8 carbon atoms, and alkylaminoalkanols having from 3 to 8 carbon atoms, and vinyl sulfonate; and
   (v) from 0 to 0.5% by weight of said polymerizate of olefinically-unsaturated polyallyl cross-linking monomer units, said substantially non-cross-linked ester copolymer being produced by aqueous emulsion polymerization.

2. The ester copolymer of claim 1 wherein component (i) is present in an amount of from 90% to 99% by weight, component (ii) is present in an amount of from 0.5% to 5% by weight, component (iii) is present in an amount of from 0.5% to 8% by weight, and components (iv) and (v) are absent.

3. The ester copolymer of claim 1 wherein $R_2$ is chloro.

4. The ester copolymer of claim 1 wherein $R_3$ is selected from the group consisting of chloro and hydroxy.

5. The ester copolymer of claim 1 wherein $n$ is an integer from 1 to 2.

6. The ester copolymer of claim 1 wherein component (iv) is present in an amount of from 0.5% to 10% by weight.

7. The ester copolymer of claim 6 wherein component (iv) is present in an amount of from 1% to 5% by weight.

8. The ester copolymer of claim 1 wherein component (v) is present in an amount of from 0.05% to 0.5% by weight.

9. The ester copolymer of claim 1 wherein not more than one $R_1$ is methyl.

10. The ester copolymer of claim 1 wherein X is —NH—.

11. The ester copolymer of claim 1 wherein not more than one $R_1$ is methyl, $R_2$ is chloro, $R_3$ is a member selected from the group consisting of chloro and hydroxy, X is —NH— and $n$ is an integer from 1 to 2.

12. A process for the manufacture of an ester copolymer as claimed in claim 1 which comprises polymerizing monomer components (i), (ii) and (iii) as defined in claim 1 in an aqueous emulsion in the presence of an emulsifier and/or a protective colloid, and of a free-radical initiator at a temperature of from 0° to 100° C.

13. A process for cross-linking an ester copolymer as claimed in claim 1 which comprises heating it to a temperature of from 100° to 150° C.

14. A process for cross-linking an ester copolymer as claimed in claim 1 which comprises heating it to a temperature of from 130° to 150° C.

15. A process for cross-linking an ester copolymer as claimed in claim 1 which comprises treating it with an acid at a pH below 3.

16. A process for cross-linking an ester copolymer as claimed in claim 1 which comprises treating it with a base at a pH above 9.

17. The ester copolymer of claim 2 wherein component (ii) is 2-allylamino-4,6-dichloro-s-triazine.

18. The ester copolymer of claim 2 wherein component (ii) is 2-allyloxy-4,6-dichloro-s-triazine.

19. The ester copolymer of claim 2 wherein component (ii) is 2-butenylamino-4,6-dichloro-s-triazene.

20. The ester copolymer of claim 2 wherein component (ii) is 2-allylamino-4,6-dichloro-s-triazine and component (iii) is N-methylolacrylamide.

21. The ester copolymer of claim 2 wherein component (ii) is 2-allylamine-4,6-dichloro-s-triazine and component (iii) is the Mannich base of acrylamide with dimethylamine.

* * * * *

UNITED STATES PATENT OFFICE
CERTIFICATE OF CORRECTION

Patent No. 4,098,985      Dated July 4, 1978

Inventor(s) HARTMUT BRABETZ; HUBERT WIEST and DIETER GORZEL

It is certified that error appears in the above-identified patent and that said Letters Patent are hereby corrected as shown below:

| Col. | Line | |
|---|---|---|
| 1 | 62 | "$\alpha-\beta$" should be --$\alpha,\beta$-- |
| 3 | 25 | "an n" should be --and n-- |
| 6 | 35 | "if" should be --of-- |
| 7 | 16 | "preferably referably from" should be --preferably from-- |
| 7 | 25 | "from 0.5%" should be --from 0.05%-- |
| 11 | 35 | Insert "Example 5" |
| 13 | 66 | "$\alpha$-unsaturated" should be --$\alpha$-unsubstituted-- |

Signed and Sealed this

*Fifteenth* Day of *May 1979*

[SEAL]

Attest:

RUTH C. MASON
*Attesting Officer*

DONALD W. BANNER
*Commissioner of Patents and Trademarks*